United States Patent
Wright

[15] 3,670,147
[45] June 13, 1972

[54] ELECTRONIC INSTRUMENT FOR DETERMINING AND TOTALIZING THE REPETITIVE OPERATION OF A MATERIAL FABRICATING MACHINE

[72] Inventor: Richard B. Wright, 448 Saint Andrews Drive, Akron, Ohio 44303

[22] Filed: Oct. 3, 1969

[21] Appl. No.: 863,493

[52] U.S. Cl. ................... 235/92 J, 235/92 R, 235/92 PD, 235/92 T
[51] Int. Cl. ....................................... H03k 23/03
[58] Field of Search .................... 235/92 PD, 92 FP, 92 J

[56] References Cited

UNITED STATES PATENTS

| | | | |
|---|---|---|---|
| 3,213,267 | 10/1965 | Kettlety | 235/92 |
| 3,122,722 | 2/1964 | Subry | 340/152 |
| 3,351,912 | 11/1967 | Collom | 340/172.5 |
| 3,321,704 | 5/1967 | Mann | 324/68 |
| 2,844,317 | 7/1958 | Shillington | 235/92 J |
| 3,322,937 | 5/1967 | O'Brien | 235/92 FP |
| 3,017,542 | 1/1962 | Pearce | 235/92 J |

Primary Examiner—Maynard R. Wilbur
Assistant Examiner—Robert F. Gnuse
Attorney—Baldwin, Egan, Walling & Fetzer

[57] ABSTRACT

An electronic instrument for determining and totalizing the operation and production output of a material fabricating machine such as a machine tool lathe, punch press, drill press and the like, and which instrument includes an element that is responsive to a workpiece fabricating member of the machine to actuate a counter or recorder capable of sensing the workpiece fabricating performance of the said member and totalizing the number of fabricating cycles of said machine. The instrument also includes switch means actuatable by the operator to indicate that the machine is temporarily out of production for a selective predetermined interval such as, for example, the interval required for setting up the machine preparatory to production, repair and/or adjustment of tools thereof. A timing device actuatable by the switch means which device is identifiable with the particular purpose(s) for which said machine is "out of production" or in "down time" is operable with the counter or recorder to record the reason(s) or purpose(s) for said "down time" whereby it may be visually noted, analyzed and utilized for corrective and record purposes. The instrument includes timing means for recording on said recorder the total production time and total "down time" for the machine for any preselected time period.

4 Claims, 3 Drawing Figures

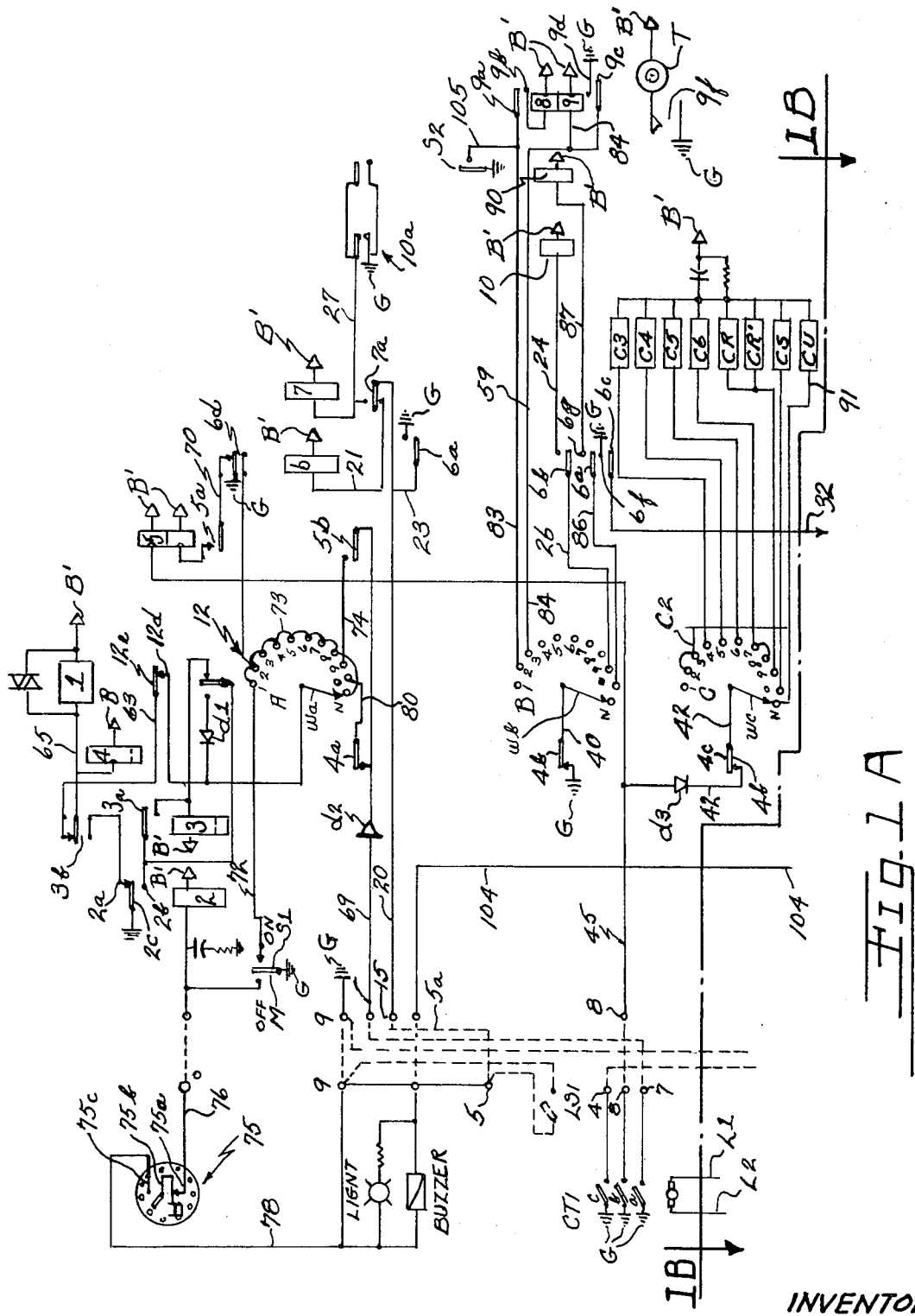

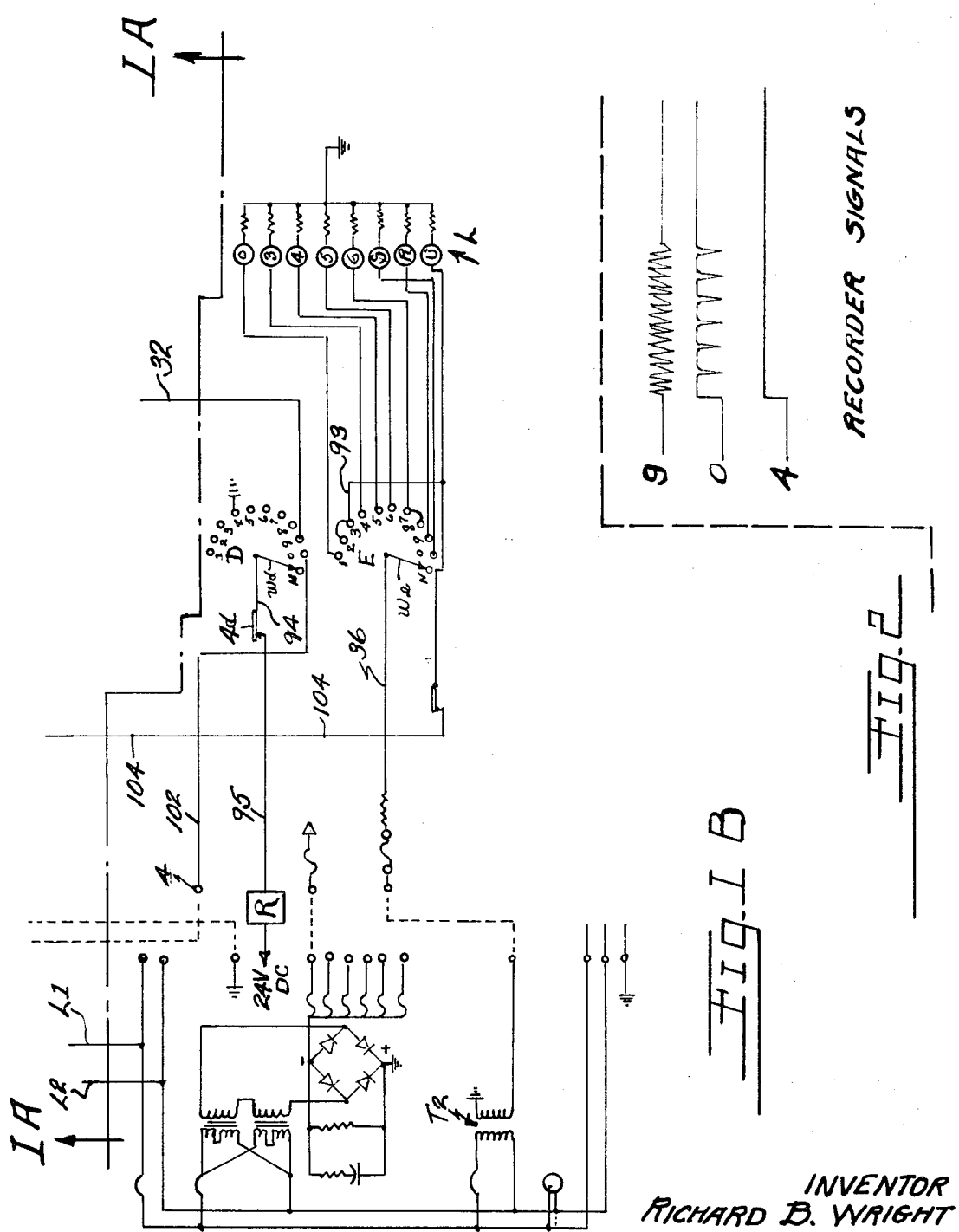

ELECTRONIC INSTRUMENT FOR DETERMINING AND TOTALIZING THE REPETITIVE OPERATION OF A MATERIAL FABRICATING MACHINE

This invention relates generally to an electronic instrument which is especially designed to be used with a machine tool, such as a lathe, punch press, drill press and the like, and which instrument is capable of monitoring said machine tool so as to determine and record the overall operation thereof.

A primary object of the electronic instrument of the present invention is to monitor and record the fabricating operation of the machine tool and to totalize and record the number of workpieces produced thereby for any predetermined period of time.

Another object of the electronic instrument is to monitor and to record the time duration and purpose(s) for which the machine tool may from time to time be taken out of production such that the production time periods and down time for the said machine tool over a preselected period of time may be readily ascertained.

Additional objects and advantages of the electronic instrument of the present invention will be apparent to one skilled in the art to which it pertains and upon reference to the following disclosure of a preferred embodiment thereof, and which is illustrated in the accompanying drawings in which:

FIGS. 1A and 1B are the schematic wiring diagrams of the circuitry of the present instrument; and FIG. 2 is an illustration of a typical record pattern made on the recorder device which is incorporated into the instrument of the present invention.

With reference now directed to said schematic wiring diagram of FIGS. 1A and 1B, the electronic instrument includes a normally open switch of conventional construction identified by the reference LS1 and which is intended to be closed when depressed by suitable pressure and returned automatically to its open position when the pressure is removed therefrom. Switch LS1 is intended to be associated with the machine tool which is to be monitored in such a way that it is actuated to its closed position each time a workpiece is fabricated by said machine tool. As for example, switch LS1 may be disposed on a punch press so as to be cyclically actuated to its closed position by the reciprocating ram each time the ram performs a workpiece fabricating operation.

The actuation of switch LS1 to its closed position is intended to cause the responsive actuation of a suitable counter device such as is identified by the reference 10.

To accomplish this operation of counter 10, the electronic instrument includes a circuit which may be identified in its entirety as the count ring circuit and which is identified as follows.

A conventional multi-deck stepping switch as identified in its entirety by the reference numeral 12 is provided with five separate contact decks or wafers A-E, respectively.

One side of the switch LS1 is connected to a terminal identified by the reference numeral 9 which, as will be hereinafter referred to, is also identified as the instrument ground G.

The opposite side of the switch LS1 is connected to a terminal 5 and by conductor 5a to instrument terminal 15 and thence by conductor 20 to the movable contact of a normally closed contact 7a is connected by way of conductor 21 to the coil of a conventional electromagnetic relay as identified by the reference numeral 6, said coil being connected by conductor 22 to a suitable negative D.C. potential of 24 volts D.C. which is obtained through common bus bar B' which identifies the output of a conventional D.C. power source which in turn is identified in FIG. 1B in its entirety by the indicia Power Supply.

Relay 6 is also seen to be provided with a movable contact 6a which is in its normally open position, and which is connected by conductor 23 to conductor 20. Contact 6a is intended to engage its associated stationary contact to thereby connect the same to instrument ground G.

Said relay 6 is also provided with a second normally open contact identified as 6b, one side of which is connected by conductor 24 to the aforementioned counter 10, said counter 20 likewise being connected to the aforementioned bus bar B' of the power supply and hence actuated by said negative D.C. potential. The opposite side of the normally open contact 6b is connected by conductor 26 to a stationary contact 9 on level B of the aforementioned stepping switch 12.

As shown, the wiper contact $w_b$ for switch level B as all of the other wiper contacts of the stepping switch 12, is in engagement with the stationary contact at the 11th or "N" position on each of said wafers, the stepping switch in its present configuration being an 11 position switch and shown in its at rest position or what may be referred to as the unclassified or home position for said switch.

The counter device 10 is provided with a normally open contact identified by the reference 10a, one side of which is connected to the instrument ground G and the other side by way of conductor 27 to one side of the coil of a conventional electromagnetic relay identified at 7, the opposite side of said relay coil being connected to said power supply bus bar B'.

With this control circuitry, and assuming that the wiper contact for wafer or level B for the stepping switch 12 is disposed so as to be in contact with its stationary contact 9, which may also be referred to as the "production count" position, when the switch LS1 is momentarily closed as by the actuation of the reciprocal ram of a punch press the coil of relay 6 will be energized to close its normally open contact 6b which in turn connects the counter 10 across the power supply by way of conductor 24, closed contact 6b, conductor 26, stationary terminal 9 of switch level D, wiper contact $w_b$, conductor 40 connected to said wiper contact and system ground G. As a result, counter 10 is energized or pulsed to signify the reciprocation of the tool element by the closing of switch LS1. Normally open contact 10a of the counter 10 is likewise closed to energize the coil of relay 7, the circuit therefore being bus bar B', coil of relay 7, conductor 27, the now closed contact 10a of counter 10 and system ground.

As a result of the energization of the coil of relay 7, contact 7a of said coil is moved to its upper closed position to thereby disconnect the coil of relay 6 from the power supply effective to deenergize the same whereby the contact 6a of said relay is again moved to its open position as likewise is contact 6b thereof.

As a result, the counter 10 is disconnected from its energy source by way of said open contact 6b. When this occurs the contact 10a of counter 10 is opened to deenergize the coil of relay 7 whereby its contact 7a moves or transfers again to its lower position as shown in the schematic wiring diagram.

With this circuitry, it will now be seen that the counter device 10 is momentarily actuated only once per each actuation of switch LS1.

If switch LS1 for some reason remains closed, for example due to a slow moving ram or other actuating member on the machine tool or in the event that the machine tool inadvertently stops with switch LS1 in its closed position, relay 7 will remain energized so long as such switch LS1 is closed inasmuch as the previous energization of said relay 7 and the responsive closure of contact 7a connects the signal or pulse from the closed switch LS1 directly to the coil of relay 7 whereby said coil remains connected across the instrument power supply.

As a result, relay 6 is deenergized to disconnect the counter from its power supply.

To facilitate the proper operation of this "count ring circuit," relay 6 is selected to be a realtively fast operating relay so as to be immediately responsive to the closing and opening of switch LS1.

The stepping switch 12 receives commands or signals from three sources in its operation to control the present instrument; it receives a signal from switch LS1 in the manner just described to provide the production count of the machine on counter device 10.

Said stepping switch may also receive command signals from a manually operated dial unit identified at 75 in FIG. 1A which may be of conventional construction such as the type incorporated in the domestic telephone. Said stepping switch 12 may likewise be actuated by clock pulses or signals from a clock unit identified at CT1 in FIG. 1A.

In its present form dial unit 75 is provided with a normally closed switch contact 75a which is momentarily moved to its open position when the operator rotates or strokes the dial actuator in the act of dialing a number in a manner as is well understood and then releases the dial actuator whereby it starts its step-by-step rotational return to its at rest position. The number of times the switch contact 75a is momentarily opened corresponds to the degree of rotational actuation of the dial actuator.

Dial unit 75 is also provided with a normally open contact 75b which is moved to its closed position by the stroke or dialing of the dial actuator as it is rotated fully clockwise as viewed in FIG. 1A. The stationary contact 75c associated with contact 75b is connected by conductor 78 to terminal 9 and hence to instrument ground G.

As also seen in FIG. 1A, the normally closed switch contact 75a is connected by conductor 76 to one side of the coil of relay 2, the opposite side thereof connecting to the bus bar B' for the instrument.

When the aforesaid dial actuator is moved so that contact 75b is brought into engagement with the stationary contact 75c of the coil of relay 2 is connected between the source of energy (bus bar B') and instrument ground G whereby it is energized.

Relay 2 is provided with a normally closed contact 2a and a normally open contact 2b, each being associated with a movable contact 2c which is connected to ground G.

When relay 2 is energized, the movable contact 2c engages contact 2b whereby the coil of relay 3 is connected across the instrument energy source (bus bar B') and instrument ground G and is thereby energized.

Contact 2b is connected by conductor 60 to a movable contact 12a of stepping switch 12 which in its at rest position is normally engaged with an associated stationary contact 12b. A second stationary contact 12c is connected through diode D1 and conductor 61 to movable contact 12d of said stepping switch which is seen to be in engagement with stationary contact 12e, the latter connected by conductor 63 to stationary contact 3a of relay 3. Said relay 3 is also seen to have a movable contact 3b which normally engages contact 3a and which in turn connects by conductor 65 through one side of the motor 1 of stepping switch 12, the opposite side thereof connecting to the energy source—bus bar B'.

With this circuit structure, if any number is dialed, the stroke of the dial or clockwise rotation thereof moves the dial contact 75b into engagement with the associated contact 75c whereby the coil of relay 2 is energized. When relay 2 is energized the movable contact 2c thereof is actuated into engagement with the stationary contact 2b whereby the coil of relay 3 is energized through closed contacts 2b and 2c of relay 2, conductor 60, contacts 12a and 12c of the stepping switch 12 which are closed in any position of the stepping switch excepting the home position which is position 1 as shown in FIG. 1A. The motor 1 of the stepping switch which is connected to the wiper contact rotor for driving the same is energized through closed contacts 2b and 2c of relay 2, conductor 60, closed contacts 12a and 12c of the stepping switch, diode D1 and conductor 61, contacts 12d and 12e, conductor 63, closed contacts 3a and 3b of relay 3, and conductor 65. The motor of the stepping switch is thereby energized and rapidly drives its connected rotor to its home position which is identified as position N in FIG. 1A.

When the motor 1 of stepping switch reaches its home position N contacts 12a and 12b are opened and the movable contact 12a then is moved into engagement with contact 12c. The motor 1 of said stepping switch is thus disconnected from the energy source.

While the dial is in its stroked position or fully clockwise when actuated by the operator and after the motor 1 of the relay stepping switch 12 reaches its home position whereby contacts 12 and 12b are closed, the coil of relay 3 is energized through the circuit beginning with the bus bar B' connected to one side of coil 3, conductor 66, contacts 12b and 12a of the stepping switch, conductor 60, closed contacts 2b and 2c of relay 2 and the instrument ground.

When the dial is released by the operator to begin its counterclockwise rotational return to its addressed position, contact 75a thereof is intermittently opened at each position of the dial which is thus effective to alternately energize and deenergize relay 2 to thereby transmit the dial pulses through the periodically closed relay contacts 2c and 2a, which is effective to transmit said pulses through conductor 67 connected between contact 2a and contact 3a of relay 3, movable contact 3b of said relay 3 and conductor 65 to the motor 1 of stepping switch 12 so as to step the motor to an actuated position corresponding to the number dialed.

When the dial reaches its at rest position and the dialing is complete, the coils of relays 2, 3 and 4 are deenergized and return to their respective at rest positions.

The relays 2, 3 and 4 are each preferably a slow release relay with respect to the dial pulses generated as the dial begins its rotational return counterclockwise as shown in FIG. 1A to its at rest position so that they stay energized for the duration of the entire pulse train generated thereby. In practice said relays are actually closed for a greater period than the duration of the pulse train generated by the return stroke of the dial.

The coil of a relay 4 is also shown to be connected across the energy source—bus bar B'—and conductor 65 so as to be connected across the motor 1 of the stepping switch 12.

Relay 4 is seen to have a normally-open contact 4a having one side connected to stationary terminal No. 10 in level A of the stepping switch, the opposite side of said contact connecting with conductor 68 which in turn connects to one side of diode D2, the opposite side of said diode connecting through conductor 69, terminal 7. As shown in FIG. 1A terminal 7 is connected by its jumper 7a to a companion terminal also identified at 7 which is connected through one side of normally open contact of the clock CT1, the opposite side of said contact connecting to the instrument ground.

Relay 4 also has a normally closed contact connecting on one side through the wiper contacts for the stepping switch in each of the switch levels B, C and D as shown in FIGS. 1A and 1B.

With this circuit structure when the coil of relay 4 is energized contacts 4b, 4c and 4d of relay 4 are opened to disconnect the wipers of said switch levels from their associated circuitry later to be described.

In like manner, when relay 4 is energized the normally open contact thereof 4a connects the stationary contact 10 of switch level A to the instrument ground through diode D2 and conductor 69 and connected terminals 7. In this manner stray signals which may appear on the circuit from extraneous sources are prevented from affecting the stepping switch operation.

In this manner the actuation of the dial unit 75 by the operator is effective to automatically step the stepping switch 12 to any preselected switch position, the reason for which will be hereinafter more apparent.

As aforementioned, the stepping switch 12 may also be actuated by pulses or signals from the clock unit identified at CT1 in FIG. 1A.

The clock unit CT1 may be of any conventional clock timer structure and is seen to have three normally open switch contacts which are moved to a closed position connecting terminals 4, 8 and 7 respectively to the instrument ground upon the energization of the clock when the primary source of power is applied across power lines L1 and L2.

The contacts of timer unit CT1 which may be identified as contacts A, B and C are closed immediately upon the energization of the clock unit and said clock unit provides a pulse at any predetermined fixed interval such as for example at intervals of one-fiftieth of an hour. These pulses on said closed contacts A–C respectively are taken through conductor 45 to the coil of relay 5, the latter connecting at its opposite side to the energy source—bus bar B'.

When said clock pulse is applied to the coil of relay 5 it energizes said relay. Relay 5 is seen to be provided with a normally open contact 5a one side of which is connected to a bus bar B and the opposite side by conductor 70 to one side of a normally closed contact 6d of relay 6, the opposite side of said contact 60 connecting to system ground G.

When relay 5 is thus energized contact 5a thereof closes and is effective to lock in said relay in its energized condition.

As previously indicated, if the switch LS1 is closed by the work performing member of the machine to which the monitoring instrument is connected, relay 6 is energized for each closure of said switch LS1 to thus indicate a work performing function by said machine member.

As long as production is being performed by the machine as evidenced by the periodic closing of the switch LS1, relay 5 is first energized and then permitted to be deenergized for each energization of relay 6 during the fabricating cycle of each workpiece.

If, for any reason the production of the machine is terminated, as for example the machine is stopped and/or the supply of material has been exhausted whereupon the production is stopped and the switch LS1 remains in its opened condition as shown in FIG. 1A, the clock pulse appearing on conductor 45 energizes relay 5 whereafter said relay is locked in its energized condition as heretofore described. Thereafter, with relay 5 energized, if relay 6 does not subsequently become energized by reason of the switch LS1 being opened, the clock pulses appearing on terminal 7 and terminal jumper 7a are applied through conductor 69, diode D2 and closed contact 5b to contact No. 9 of level A of the stepping switch 12 and thence to the wiper for said level $w_a$ and through conductor 61, closed contacts of stepping switch 12e and 12d, conductor 63 and closed contacts 3a and 3b of relay 3, conductor 65 to the coil of relay 4 whereupon said relay is energized. As a result contact 4a is closed to thereby connect the pulses appearing on line 69 to contact 0 of the level A of the stepping switch 12 whereby said pulses appearing on conductors 61 and 65 connecting to the motor 1 of the stepping switch 12 enable said stepping switch to be driven rapidly to its home position which heretofore has been identified as position N.

With this circuit structure, the stepping switch thus remains in the home position—N—until it is subsequently energized or actuated in the manner as will be hereinafter described by the actuation of switch LS1 and/or the actuation of the dial unit 75 by the operator.

As seen in FIG. 1A the level A of stepping switch 12 is provided with eleven stationary switch contacts numbered 1–0, N, each of which is separately connectable with the wiper contact $w_a$ thereof.

Stationary contacts 1–8 and N are shown to be connected together by jumper 73.

Stationary contact 9 is connected by conductor 74 to one side of the contact 5b of relay 5. Conductor 72 connects at one end with contact 1 and at its opposite end with stationary contact marked "on" of manually operable switch S1, the movable contact M thereof being connected to system ground G. Switch S1 is manually moved by the operator to its "on" position when it is desired that the monitoring instrument be used. The "off" position for switch S1 is seen to be connected by conductor 77 to conductor 76.

The stationary contact 0 of switch level A is connected by conductor 80 to one end of the normally open contact 4a of relay 4, the opposite side of said contact as aforementioned connecting to conductor 69.

The level B of stepping switch 12 is likewise provided with 11 spaced stationary contacts each of which is intended to be engageable with the wiper contact $w_b$. The stationary contact numbered 2 is connected by conductor 83 to movable contact 9a of relay 9, the associated stationary contact 9b thereof being connected the coil of said relay 9, the latter connecting to the bus bar B'. The relay 9, as is relay 5, is what is commonly referred to in the art as a double coil relay of conventional construction having two separate coils. One of the coils in relay 9 is connected at one side to the stationary contact 9b just mentioned and the opposite end of the coil is connected to the bus bar B'. The second relay coil for relay 9 which is shown as the lowermost of the two in FIG. 1A has its one end likewise connected to the bus bar B' and its opposite end connected by conductor 84 to stationary contact No. 3 and connected in parallel with said contact with movable contact 9c of said relay 9, the associated stationary contact as identified at 9d being connected to system ground as indicated at G.

As aforementioned, stationary contact numbered 9 of switch level B is connected by conductor 26 to relay contact 6b of relay 6, the latter being connected by conductor 24 to the production counter device identified at 10, which in turn is connected to bus bar B'.

The stationary contact numbered 0 is connected by conductor 86 to movable contact 6e of relay 6, a stationary contact associated therewith as identified at 6g connecting by conductor 87 to a counter device illustrated schematically at 90 in FIG. 1A, said counter device being likewise connected to the bus bar B'. A second stationary contact 6f associated with the movable contact 6e is seen to be connected to system ground G.

Movable contact 6c of relay 6 and which is intended to be moved into engagement with stationary contact 6f is connected by conductor 32, as shown in FIGS. 1A and 1B, to the stationary contact numbered 9 of the switch level D.

Stepping switch 12 is likewise provided, as aforementioned, with switch level C. This likewise has a plurality of stationary spaced contacts numbered 1–0, N and a movable wiper contact $w_c$ associated therewith. Stationary contacts 2 and 3 are shown to be connected by jumper C2 to stationary contact numbered N, the latter being connected by conductor 91 to a timer unit of conventional design illustrated schematically by the reference CU. Stationary contacts of said switch level C numbered 4–8 are each individually connected to a similar timer unit each identified respectively by the reference characters C3, C4, C5 and C6, the latter connecting to both stationary contacts 7 and 8. Stationary contact numbered 9 is connected to a pair of timer units identified at CR and CR' connected in parallel. Stationary contact numbered 0 is also shown to be connected to a similar timer unit identified at CS.

The timer devices are also connected in parallel with each other and to the bus bar B'.

The wiper contact $w_c$ is connected by conductor 42 to one side of normally closed contact 4b of relay 4, the opposite side of said contact connecting through diode $d_3$ and conductor 45 to bus terminal 8 of clock timer CT1. Terminal 8 connects to one side of one of the three normally open contacts of clock timer CT1. As shown, the actuating solenoid for timer CT1 is connected across power lines $L_1$ and $L_2$ being thus energized when power is applied to said lines $L_1$, $L_2$ to close said contacts.

As aforementioned, when the wiper contact $w_b$ of switch level B is in engagement with its associated stationary contact 9, the production output of the machine will be tabulated on production counter or register 10.

At the same time, wiper contact $w_c$ on switch level C is in contact with its associated stationary contact 9 and the timer or counter units CR and CR' will be energized. As shown, the pulses from clock CT1 are transmitted from terminal 8, via conductor 45, diode $d_3$, conductor 42, wiper $w_c$, stationary contact 9 to timer units CR and CR' whereby the same are energized by said pulses.

Stepping switch 12, as aforementioned, has a switch level identified as level D, the stationary contact 9 thereof connecting through conductor 32 to movable contact 6c of relay 6.

The wiper $w_d$ of said switch level is connected by conductor 94 to one side of normally closed contact 4d, the opposite side of said contact connecting by conductor 95 to a recorder R shown diagrammatically in FIG. 1B. Recorder R may be of any conventional design such as, for example, a strip chart type of recorder known as the Esterline Angus 2010 Event Recorder.

When the stepping switch is in its "production run" position wherein the wiper contact of each switch level engages its associated stationary contact 9, the recorder R is intended to be periodically connected across a −24 volt supply source through switch level D, the circuit therefor comprising, the −24 volt source connected to one side of the recorder, conductor 95, contact 4d of relay 4, conductor 94, wiper contact $w_d$, stationary contact 9 of switch level D, Conductor 32, contact 6c of relay 6 to instrument ground G.

The recorder R is thus energized each time relay 6 is energized to provide a visible trace pattern as shown at line 9 in the chart pattern of recorder R to thereby indicate that production is being performed.

Switch level D, as seen in FIG. 1B, also has the stationary contact 0 connected by conductor 102 to terminal 4 which, in turn, connects with the top open contact of clock device CT1 as shown in FIG. 1A.

When the stepping switch 12 is actuated to its unclassified position wherein the wiper contact of each switch level engages stationary contact 0, the clock pulses of clock CT1 appearing at terminal 4 are applied through switch level D to the recorder R to provide a chart pattern that is identified at line 0 in FIG. 2 thus indicating that the connected machine is in its "unclassified" position.

In like manner, stationary contact 4 of switch level D is connected to instrument ground G, and when the stepping switch is actuated to bring the wiper contact $w_d$ into engagement with said stationary contact 4, the recorder R is connected across its energy source to provide the record pattern identified at line 4 of FIG. 2. Suitable additional clock units of the type used for CT1 may be incorporated for use with each of the down time classifications assigned to stepping switch positions 4, 5, 6, 7 and 8 for level C so that a record of each may be applied to the recorder R and accumulated therein.

The stepping switch 12 is also provided with switch level identified at E and which has a movable wiper or contact $w_e$ and a plurality of associated stationary contacts (1–0, N) respectively.

Each of the stationary contacts 1, 4–8, 9 and 0 is connected to one side of a suitable indicator lamp L which, in turn, is connected to the instrument ground G. The movable contact $w_e$ is connected by conductor 36 to one side of the secondary of transformer T2. Switch contacts 2, 3 and N are connected together by jumper 93 and to lamp identified at U which is shown connecting to contact N.

With the said movable contact $w_e$ in engagement with any one of its associated stationary contacts the lamp connected to the latter will hence be illuminated.

Each lamp L may be a different color, if desired, or may be provided with a symbol or number as shown in FIG. 1B corresponding to its connected switch position whereby said characteristic color or symbol may be designated to indicate a specific function or malfunction of the machine as above described.

A typical operational sequence of the instrument of this invention for a production count is as follows.

Assuming that the stepping switch 12 is in one of its actuated positions other than switch position 0 (set-up) or 9 (production) and with the machine placed into operation so that the switch LS1 is closed beginning the production run for said machine, the pulse from said switch and applied through conductor 20, closed contact 7a of relay 7, and conductor 21 is operable to energize the coil of relay 6. Relay contact 6a of said relay 6 is moved to its closed position effective to connect conductor 20 to instrument ground G so as to lock relay 6 in its energized condition.

Relay contact 6d of relay 6 is also moved to its grounded position to ground stationary contacts 1–8 and N of switch level A, and also the wiper contact $w_a$ when the latter is in engagement with one of said stationary contacts.

The motor 1 of stepping switch 12 is thereby connected across its power source (bus bar B' and ground G) and energized to rapidly step its wiper contact rotor through the intermittently closed contacts 12d and 12e of said stepping switch to the production run position (stationary contact 9). At this instant, the counter unit 10 is actuated in switch level B to begin tabulating the number of units produced.

At the end of the production run, at which time switch LS1 is not operated, relay 5 remains energized, as above described, whereby the pulse train of clock CT1 is applied to stationary contact 9 of switch level A effective to energize relay 4 whereby clock pulses of clock CT1 are also applied to stationary contact 0 of said switch level A.

As a result, the motor 1 of stepping switch 12 is rapidly driven to its home position whereby the wiper contact $w_a$ engages stationary contact N.

At this instant, wiper contact $w_e$ engages its stationary contact N of switch level E to thereby connect indicator lamp U across the secondary of transformer T2 whereby it is illuminated.

The buzzer and light shown in FIG. 1A being connected to terminal 9 and instrument ground G are also connected to said transformer T2 to thus signal the operator visually and audibly, that the production run is completed and he should dial a down time classification.

The operator can then dial the down time classification through dial circuit 75 as for example the dial number effective to advance the stepping switch to actuate timer unit C5 of switch level C. The clock CT1 is thereby connected through wiper contact $w_c$ whereby the clock pulses are accumulated in timer unit C5 to record the interval of down time for the particular classification assigned to said switch position and timer unit C5.

At the same time, the indicator lamp 5 is illuminated to thereby provide a visual signal of the particular down time classification for the machine.

In the event the operator needs assistance, he can first dial the selected number which advances the wiper contact $w_a$ of stepping switch into engagement with its stationary contact 3.

As a result relay 4 is deenergized and its contact 4b is closed to connect said stationary contact 3 to instrument ground G.

Relay 9 is thereby energized and is locked-in through its contacts 9c, 9d. Contact 9f of relay 9 is also closed effective to illuminate lamp T to signal that the machine operator needs assistance.

The operator can thereafter dial any selected number corresponding to his down time classification; however, relay 9 remains energized and lamp T illuminated. The stepping switch 12 will then advance in its normal manner to its selected down time position.

When assistance has been obtained, the operator can then dial the corresponding number to advance the wiper contact $w_b$ into engagement with its stationary contact 2 whereby the second winding of relay 9 is connected to instrument ground G through closed contacts 9a, 9b. The second winding of relay 9 is effective to provide a reversibly directed magnetic flux field causing relay 9 to deenergize the resultant field to pass through zero at which time relay 9 is deenergized and its contacts 9a, 9b and 9c, 9d are opened to disconnect relay 9 and lamp T from the power source.

If desired, manually operable switch S2, FIG. 1A connected by conductor 105 to contact 9a may be closed to provide the same operation of relay 9 as just described.

If the operator desired to set up the machine prior to production and to run a few sample pieces so as to determine the proper location of all tools and machine parts, he merely dials the number set for this classification to advance the stepping switch 12 to its 0 switch position.

Thereafter, each time switch LS1 is closed by the machine fabricating element, its actuation is recorded on counter device 90 connected to switch level B FIG. 1A, the "count-ring circuit" as above described functioning to prevent more than one actuation of said counter device 90 per each actuation of switch LS1.

The counter device CS connected to switch level C of stepping switch 12 is also connected to the clock CT1 in the 0 stepping switch position and is operable to record the set-up classification time.

At the conclusion of the set-up period, the operator may then dial the number assigned for production switch position 9 or shut-down position N and the stepping switch 12 will be advanced in the previously described manner to either of said positions.

Having described a preferred embodiment of the electronic instrument of the present invention, it will be understood by one skilled in the art that the inventive concepts herein are susceptible to various modifications, changes and combinations of parts without departing from the invention as defined in the claims.

What is claimed is:

1. An analyzer unit for use with a work performing tool which has a member that is repetitively operable to fabricate a workpiece on each repetition comprising switch means actuatable from a first position to a second position by the repetitively operable member of the work performing tool and to provide a signal representing each repetition thereof, a pair of relays, circuit means connecting said switch means to one of said relays, said switch means being actuatable by said operable member of said work performing tool to said second position effective to produce said signal to operate said one relay to a first condition, counter means, contact means for said one relay in circuit with said counter means and actuatable in response to said one relay being actuated to said first condition effective to cause said counter means to receive and accumulate said signals to totalize the number of repetitions of said tool member, the second relay of said relay pair being normally in a first condition and including contact means connected into said circuit means in series circuit control relation between said switch means and said one relay, said counter means having contact means connected in series circuit controlling relation with said second relay, said second relay being normally actuatable to a second condition in response to each operation of said counter means effective to cause the operation of its contact means and cause the first relay to be actuated to a second condition effective to prevent a subsequent actuation of said one relay to its first condition until the second relay is returned to its first condition, said second relay being returned to said first condition in response to and subsequent to said switch means returning to its first position.

2. An analyzer unit as defined in claim 1 and which includes recorder means connected in circuit with said one relay being operable to provide a visual record of the operation of the work performing tool.

3. An analyzer unit as defined in claim 2 and wherein timer means are in circuit with the recorder means to provide a characteristic signal that is recorded on said recorder means to indicate a corresponding function by said work performing tool.

4. An analyzer unit as is defined in claim 3 and wherein switch means are connected in circuit with the timer means and recorder means and selectively operable to conductively connect said timer means to said recorder means.

* * * * *